United States Patent Office 3,421,229
Patented Jan. 14, 1969

3,421,229
METHOD AND DEVICE FOR CONVEYING GOODS TO AND FROM A VACUUM OR PRESSURE CONTAINER
Fritz Kniese, Marbach, Kreis Marburg, Germany, assignor to Industrie-Werke Karlsruhe Aktiengesellschaft, Karlsruhe, Baden, Germany, a corporation of Germany
Filed Jan. 20, 1967, Ser. No. 610,546
Claims priority, application Germany, Jan. 27, 1966, J 29,916
U.S. Cl. 34—92   10 Claims
Int. Cl. F26b *17/00;* F26b *19/00;* F26b *5/06*

ABSTRACT OF THE DISCLOSURE

Goods, such as food stuffs and biological substances, are continuously moved by a number of pistons arranged on an endless conveyor chain through a pair of parallel vertical pipes the inner walls of which are in sealing engagement with the pistons, whereby a vacuum is applied to the chambers formed between the pistons. The lower ends of the pipes are connected with a vacuum chamber containing an endless horizontal conveyor upon which the goods carried by the pistons are deposited.

---

The invention relates to a method and a device for conveying goods to and from a vacuum or pressure container for the purpose of being processed therein.

For conveying goods such as, for instance, food stuffs or the like, to and from vacuum containers, for example freeze driers, or pressure containers, loading means are known which are on wheels and have shelves or the like for the temporary storage of goods. After being filled with goods, these loading carts are wheeled into the given containers whereupon the same for the purpose of processing the goods are either vacuumized or subjected to superpressure. After completing the processing of the goods in the container, the same operations are now carried out in the reverse order in that the containers are filled with or emptied from air or other gases, and the loading carts are removed from the containers and are unloaded so that the cycle of operations can begin again. This entire process is characterized by an intermittent work rhythm, is cumbersome and causes energy losses by the various steps required for ventilating the containers and is furthermore time consuming since a number of operations have to be carried out.

The matter becomes still more complex when for instance a freeze drying is desired in the vacuum container because in addition to producing a vacuum there is also required a cooling to about −40° C. Since during the freeze drying the deep frozen interior of the vacuum container warms up, it has again to be deep frozen before another freeze drying can be initiated.

In order to keep these complicated arrangements and the resulting costs within certain limits, vacuum containers have been developed which have gates arranged at both sides of their interior. In this manner it is possible to maintain in the interior a vacuum of e.g. .5 torr and also the temperatures required for freeze drying. Upon moving the loading cart into the entrance gate, the same is vacuumized and subsequently opened and the loading cart is moved on into the interior of the vacuum container. Upon completion of the freeze drying the loading cart is moved into the exit gate and after the same has been filled with air or other gases, the loading cart is wheeled out of the vacuum container. Although containers of this type are more efficient in their operations due to the two gates as compared to the first described type, still there is an undesirable waiting time for the loading carts in the entrance and exit gates, respectively and, moreover, energy losses occur by the ventilation of these gates.

It is the object of the invention to overcome the aforedescribed disadvantages and to reduce the hitherto unavoidable complicated arrangements and high costs and prevent undesirable waiting periods and energy losses.

This is accomplished by a novel conveyor means for the continuous loading and unloading of goods, such as biological substances, food raw materials and food products, and the like, to be processed in a vacuum container, for instance a freeze drier, or in a pressure container. This conveyor moves continuously between an air-filled environment and a vacuum, or in an air-filled environment having different pressures, and on its way moves through pipes installed in the vacuum or pressure container which are sealed airtight with respect to the atmosphere. In this manner a continuous loading and unloading is assured in contrast to the prior discontinuously operating loading apparatus, whereby moreover the interior of the respective container remains airtightly sealed with respect to the atmosphere so that in it a steady vacuum or superpressure is prevailing and in freeze driers additionally the required temperature.

According to the invention, the conveyor means consists of an endless chain guided over sprocket wheels and has pistons attached thereto which in moving through the pipes so engage the inner walls thereof that the pistons due to their engaging pressure form a sealing closure in the manner of a labyrinth packing between the ends of the pipe in the atmosphere and in the interior of the vacuum or pressure container, respectively, so that in this way the pipe ends are subjected to different pressures. In order to obtain such an accurate sealing which makes it impossible for air to pass into the interior of the vacuum container or for the superpressure in the pressure container to fall, there are always employed a definite number of pistons in the pipes during the continuous travel of the conveyor. The number of pistons present in the pipes at a time differs and depends on the length of the pipes. In short pipes there may for instance be seven pistons, and in longer pipes about twenty pistons may be travelling.

Another feature of the invention is that the pistons are rigidly or pivotally attached to the endless chain and are constructed as conveyor containers with different shapes to receive the goods to be processed. The pistons may for instance be cylindrical, conical or may have some other form. They are also provided with washers. Thus, the pistons serve two purposes, namely, firstly as a sealing means and secondly, as a conveying means.

By the continuous travelling of the conveyor a chamber is formed at a time between two pistons and the inner wall of the pipe and this space is filled with air from the pipe opening to about the middle of the pipe and thereafter is vacuous or is under superpressure, respectively. The vacuum or superpressure space, respectively, is created in that the interiors of the pipes are in communication with pipe lines by way of which the chambers formed between the pistons are evacuated or ventilated, respectively.

Since the pistons for the purpose of attaining a complete sealing between the two pipe ends, which are subject to the atmosphere as well as to a vacuum or superpressure, respectively, engage during their travel through the pipes the inner walls thereof with a certain force, measures have to be taken to prevent to quick a wearing down of the pipes which would no longer assure a safe sealing. For this purpose the inner walls of the pipes are provided with a wear-resistant coating, for instance silicone or the like.

A further feature of the invention is that the pipes in a vacuum container serving as a freeze drier have double walls for a cooling agent to pass through the space between these two walls in order to maintain the deep freeze temperature at which the goods to be processed are supplied to the conveyor. Furthermore, the conveyor is provided with a conveying trough for loading the pistons or conveying containers, respectively, with the goods to be processed.

The invention will be described in further detail with reference to the accompanying drawings, in which.

Figure 1:
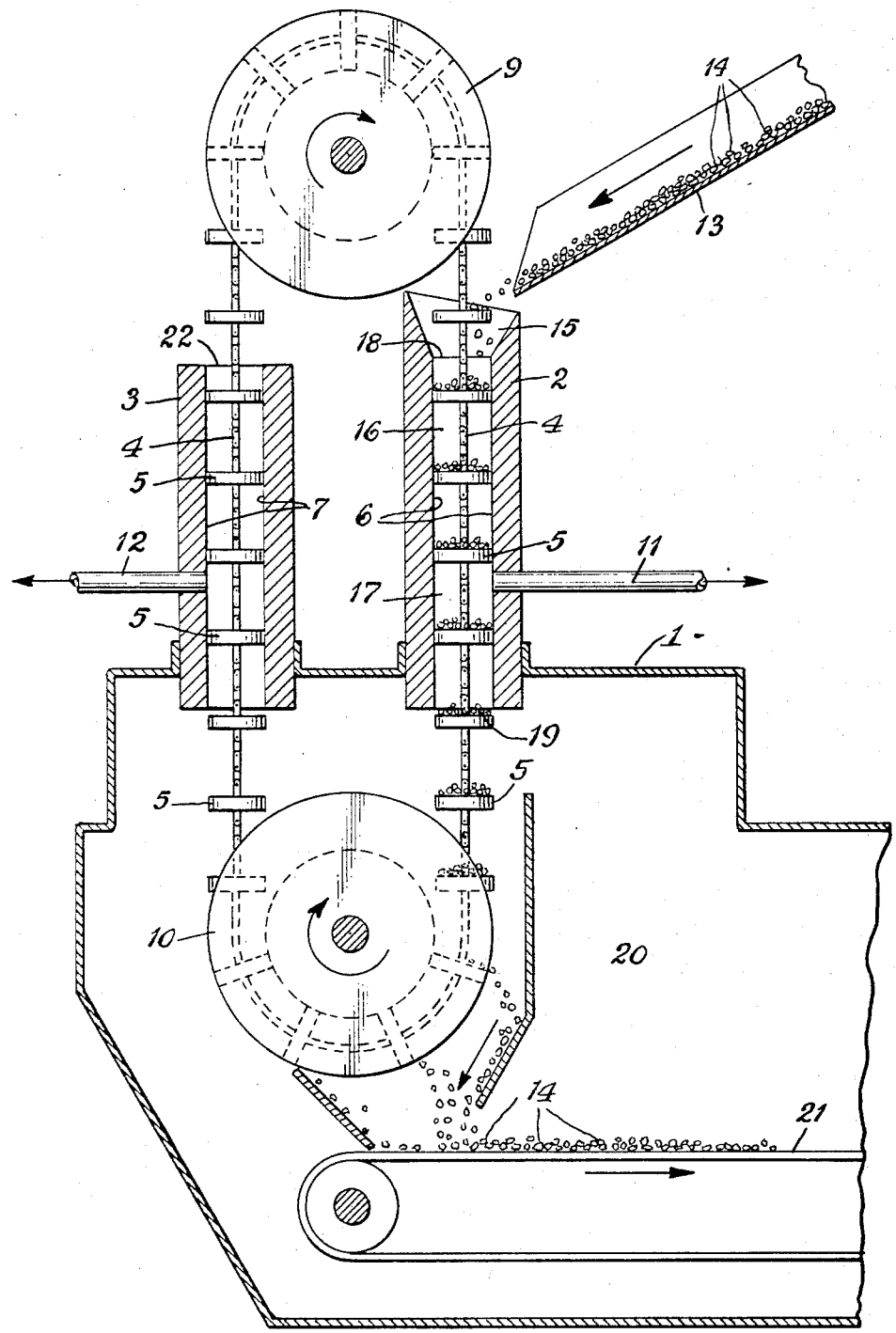
FIG. 1 is a partly sectional view with a vacuum or pressure container with the conveyor means according to the invention.
Figure 2:
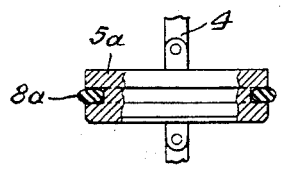
FIGS. 2 to 5 show each a different piston.
Figure 4:
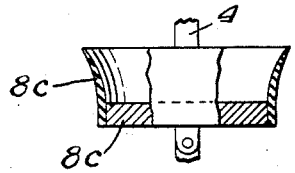
Figure 3:
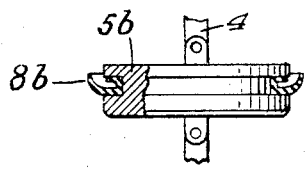
Figure 5:
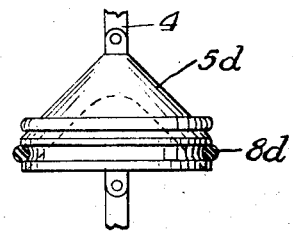

Referring to FIG. 1, a vacuum or pressure container 1 has attached thereto horizontally spaced, vertically disposed calibrated pipes 2 and 3 through the interior of which is continuously moved lengthwise a conveyor means. This conveyor means consists of an endless chain 4 which has a plurality of pistons 5 rigidly or flexibly attached thereto in spaced relationship. The pistons 5 are so constructed that they engage the inner walls 6 and 7 of the vertical pipes 2 and 3 the inner walls of which are provided with a wear-resistant coating, as for instance silicone or the like. The FIG. 2, 3, 4 and 5 illustrate each a different construction of pistons 5a, 5b, 5c and 5d having a cylindrical, a conical or some other shape and which are provided at their outer circumference with a sealing ring 8a, 8b, 8c and 8d, respectively. The chain 4 is guided over vertically spaced sprocket wheels 9 and 10. The interiors of the vertical pipe lines 2 and 3 are connected between their ends with pipe lines 11 and 12 which lead to a vacuum or an air pressure means, but they may also be connected to a gas supply means. In place of one set of pipe lines 11 and 12 there may also be provided a number of sets of pipe lines.

The operation of this conveyor will be described in the following in connection with a vacuum container.

An inclined conveyor trough 13 discharges the goods 14 to be processed into the upper flared end 15 of the pipe 2 attached to the vacuum dryer 1 which may be a freeze dryer. The goods may comprise, for instance, biological substances as antibiotics, blood plasma, ferments, bacteria and virus cultures, etc. or food stuffs like strawberries, raspberries, cherries, plums, coffee and tea extracts, etc. The flared end 15 of the pipe 2 conducts the goods onto the downwardly moving pistons 5 forming conveying containers. In moving inside the pipe 2, there is formed a chamber 16 between each two of the pistons 5 and the inner wall of the pipe 2, and the interior of this chamber is filled with air and with the goods 14. Each chamber 16 due to the continuous movement of the conveyor arrives at the point where the pipe line 11 is connected to a vacuum means and is evacuated so that now a chamber 17 is formed which contains a vacuum.

During this movement the pistons 5 engage the inner wall 6 of the pipe 2 so that a sealing closure is formed in the pipe 2 in the manner of a labyrinth packing between the pipe end 18 facing the atmosphere and the pipe end 19 inside the vacuum dryer 1. In this manner it is assured that aside from the air temporarily in the chamber 16 no additional air can enter the interior of the pipe 2.

When the lowermost evacuated chamber 17 has reached the lower end 19 of the pipe 2 and leaves the latter, it comes into communication with the interior 20 of the vacuum dryer 1 and the load 14 on the piston 5 is deposited on an endless horizontal conveyor belt 21 arranged in the dryer 1 and is moved on to its further destination.

In order to make sure that not the least amount of air may seep through the upper end 22 of the pipe 3, which receives the pistons 5 after they have left the vacuum container 1, into the interior 20, the pipe line 12 branching off from the vertical pipe 3 is connected to a source of vacuum.

When the drying is completed in the vacuum or freeze dryer 1, the goods are removed from the conveyor 21 and are transferred to a similar but not illustrated conveying means and are passed on to their further use. Prior to reaching the atmosphere again, the goods may, if desired, be subjected to a gas treatment whereby the gas penetrating the pores of the goods increases their storability.

When the container 1 is a pressure container, the pipe lines 11 and 12 are connected to suitable pressure supply sources and the pressure media are introduced into the pipes 2 and 3 in the opposite directions of the arrows shown in FIG. 1.

Figure 6:
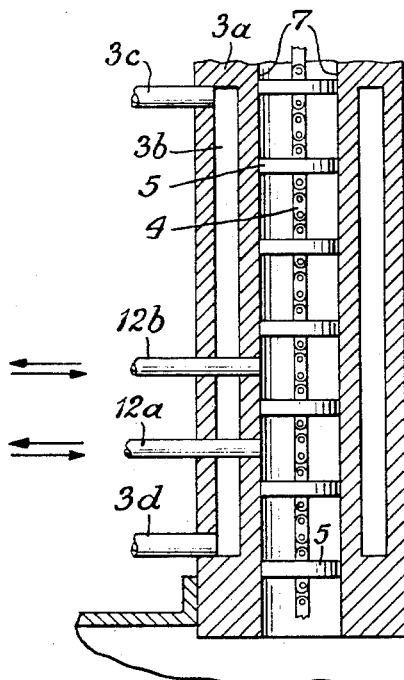
FIG. 6 illustrates a modification of the device in which double walled vertical pipes are employed.
Figure 6:
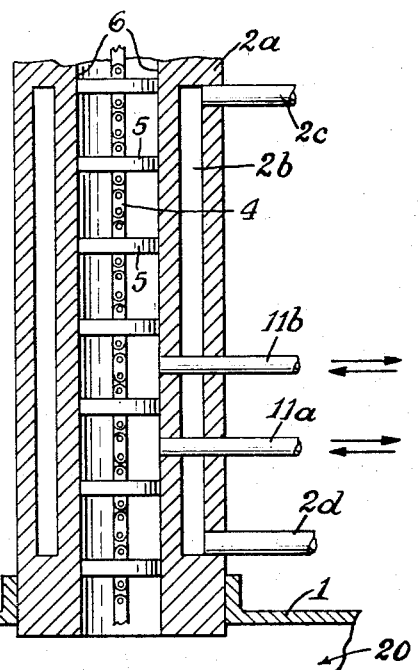

FIG. 6 illustrates an embodiment in which the vertically disposed pipes 2a and 3a are each provided with double walls between which is formed an annular space 2b and 3b, respectively, for circulating therein a cooling medium for which purpose the spaces 2b and 3b are connected with supply and discharge pipe lines 2c, 2d, 3c and 3d, respectively. It also will be noted that the interior of the double-walled pipes 2a and 3a are connected at different levels with a number of sets of pipelines 11a, 11b and 12a, 12b respectively, for the supply and discharge of treatment media.

What I claim is:

1. A device for conveying goods to and from a treatment container, comprising conveyor means consisting of an endless chain guided over vertically spaced sprocket wheels and having pistons attached thereto, upright pipes through which said endless chain is moved with the pistons thereon engaging the inner walls of said pipes in such a manner that due to their engaging pressure they form a sealing closure in the manner of a labyrinth packing between the ends of said pipes, said pipes projecting into the atmosphere and into the interior of said treatment container, respectively.

2. A device according to claim 1, in which a predetermined number of pistons travels at a time in the pipes during the continuous movement of said endless chain.

3. A device according to claim 1, in which said pistons are fixedly attached to said endless chain in spaced relation and are formed as containers for receiving the goods to be processed.

4. A device according to claim 1, in which said pistons are pivotally attached to said endless chain in spaced relation and are formed as containers for receiving the goods to be processed.

5. A device according to claim 3, in which a chamber is formed between each two of said pistons and the inner wall of said pipe, said chamber during the movement of said conveyor means is first being filled with air and subsequently is evacuated.

6. A device according to claim 4, in which the interior of said pipes are connected between their ends with pipe lines leading to a source adapted to selectively produce in said containers formed between said pistons a vacuum, a pressure and a gas.

7. A device according to claim 1, in which the inner walls of said pipes are provided with a wear-resistant coating.

8. A device according to claim 1, in which said pipes have double walls including means for passing therethrough a cooling agent.

9. A device according to claim 1, including a conveying trough for supplying the goods to be processed to said pistons when the latter are moved into the upper end of one of said upright pipes.

10. A device according to claim 3, in which a chamber is formed between each two of said pistons and the inner wall of said pipe, said chamber during the movement of said conveyor means is first being filled with air, and subsequently is subjected to a superpressure.

References Cited

UNITED STATES PATENTS

| | | | |
|---|---|---|---|
| 1,322,813 | 11/1919 | Parker | 198—206 |
| 3,192,645 | 7/1965 | Oetjen et al. | 34—92 |
| 3,234,661 | 2/1966 | Nerge | 34—5 |

FOREIGN PATENTS 975,279  11/1964  Great Britain.

WILLIAM J. WYE, *Primary Examiner.*

U.S. Cl. X.R.

34—236, 5; 198—206